United States Patent
Hunt et al.

(10) Patent No.: US 7,035,871 B2
(45) Date of Patent: Apr. 25, 2006

(54) METHOD AND APPARATUS FOR INTELLIGENT AND AUTOMATIC PREFERENCE DETECTION OF MEDIA CONTENT

(75) Inventors: Preston J. Hunt, Beaverton, OR (US); Matthew A. Bright, Ann Arbor, MI (US)

(73) Assignee: Intel Corporation, Santa Clara, CA (US)

(*) Notice: Subject to any disclaimer, the term of this patent is extended or adjusted under 35 U.S.C. 154(b) by 207 days.

(21) Appl. No.: 09/741,600

(22) Filed: Dec. 19, 2000

(65) Prior Publication Data

US 2002/0078056 A1    Jun. 20, 2002

(51) Int. Cl.
*G06F 17/30* (2006.01)

(52) U.S. Cl. .................... 707/104.1; 707/100; 707/101

(58) Field of Classification Search ............ 395/200.02, 395/154, 200.15; 707/10, 5, 9, 100, 101, 707/104.1; 709/232, 236, 238, 219; 725/46, 725/9, 115, 61, 59, 97
See application file for complete search history.

(56) References Cited

U.S. PATENT DOCUMENTS

| | | | | |
|---|---|---|---|---|
| 5,805,804 A | * | 9/1998 | Laursen et al. | 370/397 |
| 6,189,008 B1 | * | 2/2001 | Easty et al. | 705/14 |
| 6,199,076 B1 | * | 3/2001 | Logan et al. | 715/501.1 |
| 6,587,127 B1 | * | 7/2003 | Leeke et al. | 345/765 |
| 6,614,987 B1 | | 9/2003 | Ismail et al. | |
| 6,662,231 B1 | * | 12/2003 | Drosset et al. | 709/229 |
| 2001/0032336 A1 | * | 10/2001 | Kaufman et al. | 725/115 |
| 2001/0047349 A1 | * | 11/2001 | Easty et al. | 707/3 |
| 2002/0019858 A1 | * | 2/2002 | Kaiser et al. | 709/219 |
| 2002/0032019 A1 | * | 3/2002 | Marks et al. | 455/414 |
| 2002/0199193 A1 | * | 12/2002 | Gogoi et al. | 725/46 |

\* cited by examiner

*Primary Examiner*—Jeffrey Gaffin
*Assistant Examiner*—Neveen Abel-Jalil
(74) *Attorney, Agent, or Firm*—Pillsbury Winthrop Shaw Pittman LLP

(57) ABSTRACT

A system and method is provided for an automatic user preference detection system, comprising an accessing device to access attribute information of media content files distributed to a user by a media content file distribution source; a database to store a preference file for each user of the media content file distribution source, wherein the preference file for each user is utilized to determine which media content file to select to distribute to the user; and a program adapted to learn, based on the user's responses to the play of media content files, the user's media content file preferences.

27 Claims, 13 Drawing Sheets

METHOD AND APPARATUS FOR INTELLIGENT AND AUTOMATIC PREFERENCE DETECTION OF MEDIA CONTENT

BACKGROUND OF THE INVENTION

1. Field of the Invention

The present invention relates generally to the art of passive preference detection, and more particularly to a system, method, and apparatus for automatically determining the media content preferences of a user who downloads streaming media content via the Internet.

2. Description of the Related Art

There are music-distribution systems in the art that record the music preferences of the users of such systems, and play back songs based on those preferences. There are also Internet sites, for example, that allow users to manually assign a score to songs, where the score reflects the user's enjoyment of the song. Based on the user's scores, such sites intelligently select songs to send to the user that the user is likely to enjoy.

Such systems have major drawbacks, however, because a score must be manually entered for each song. Entering scores is very cumbersome and may be very confusing for new or unsophisticated users. Moreover, in a portable environment, such as in a car or on a portable player, such an elaborate controller may be difficult and/or costly to implement.

Also, such systems only use each particular user's scores when calculating which songs to send to that particular user. A drawback of this approach is that such a system may only select songs that user will like with any degree of accuracy after that user has already entered scores for a large number of songs.

Accordingly, a preference detection system is desired that does not require a user to manually score songs. A system capable of passively determining a user's music preferences is therefore desired. Such a system should be capable of learning a user's preferences based on the user's responses (such as forwarding to the next song, etc.) while each song plays. Such a system should work not only with music, but also with other types of media (video, etc.).

A preference detection system is also desired that learns which songs to send a user not only based upon that user's responses, but also based upon the responses of other users to similar songs, as patterns may appear when data from enough users is analyzed.

DETAILED DESCRIPTION OF THE INVENTION

Figure 1:
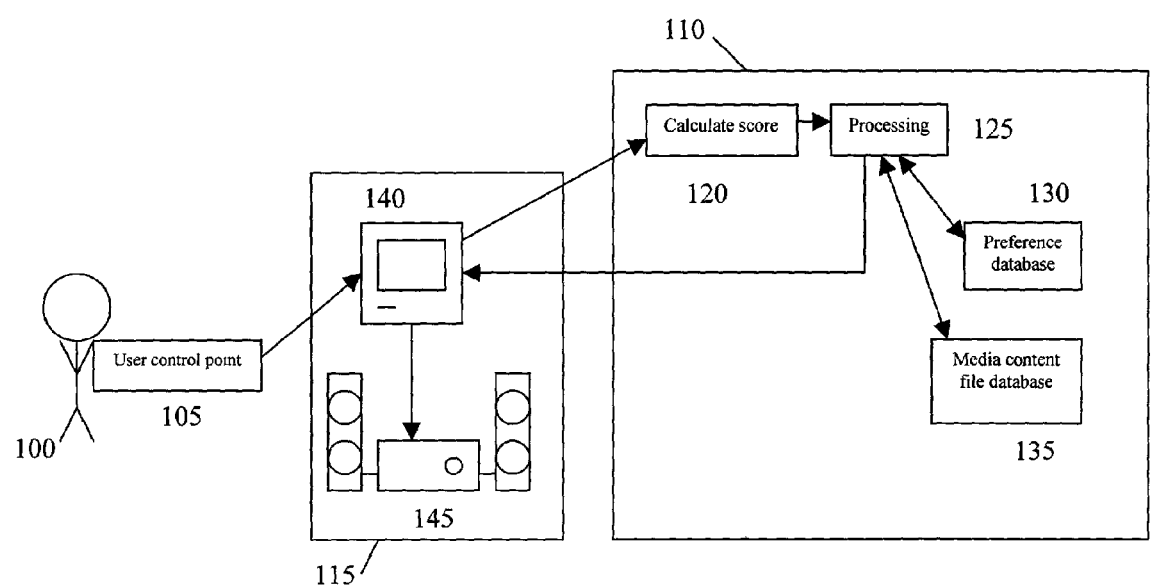
FIG. 1 illustrates an automatic preference detection system according to an embodiment of the present invention.

FIG. 1 illustrates an automatic preference detection system according to an embodiment of the present invention. As shown in FIG. 1, the present invention is a method and apparatus for the intelligent and automatic preference detection of media content files. This system is comprised of three major components: a user control point 105, a preference processing subsystem 110, and a network-enabled entertainment cluster 115. This system infers a user's 100 media content preferences, based on the user's 100 responses while media content plays, as well as on the responses of other users, and thereafter selects media content files to send to the user that the system determines the user 100 may like. In a preferred embodiment, this system is used to control media content files, such as songs in the format of music files, streamed over the Internet from an online media content database 135 to a user 100 of the system's computer 140, where the files are converted into a format playable on a device such as a stereo 145, where they are played. While a song plays on the stereo 145, the system uses a "fuzzy" logical reasoning scheme to determine to what degree the user 100 likes/dislikes the song and the particular attributes of that song. In the fuzzy logical reasoning scheme, the system infers that if the user 100 utilizes the user control point 105 to forward to the next song, the user 100 did not like the song originally playing. For example, the earlier into the song the user 100 forwards to the next song, the more likely the system will infer that the user 100 disliked the song, as well as the various attributes of the song. The user control point 105 may be any device having the function of skipping from a song currently playing to the next song. A remote control with a "Next Song" button capable of skipping to the next song file may be used as the user control point 105. If the user 100 listens to a song the entire way through, the system will infer that the user 100 likes the song being played.

For example, a score is calculated by a calculate score module 120 for each song played by the system based upon how early the "Next Song" button is hit, if at all. A song receives the highest score if it plays completely through. A song receives a low score if the "Next Song" button is hit while it is playing. The earlier into its play the "Next Song" button is hit, the lower the score.

The media content files may be streamed from a remote site. The media content files preferably contain attribute information. For example, when song files are streamed, each song may be categorized according to many attributes, such as the year the song was released, the band, the general type of music (pop, oldies, metal), where the band was from (England, America), etc. The more attributes that are associated with each song, the more accurate the system is at determining what songs the user 100 might like.

After a score is calculated and processed by a processing module 125, that score is added to a preference profile for the user 100. The user's 100 preference profile, in conjunction with the preference database 130 is used to determine which songs to send to the user 100. The preference database 130 contains a file with the user's 100 preference profile, as well as the preference profiles of every other user who has a profile with the system. The system analyzes the data in the preference database 130 and learns from patterns it detects. For example, if a user 100 typically listens to new wave hits from 80's English bands all the way through, the system will continue to play other similar songs. If, for example, the user typically listens to songs by Falco and the Human League in their entirety, the system will stream songs by other artists with many of the same attributes, such as Frankie Goes to Hollywood, to the user 100. The streamed song files are sent from an media content database 135 to the user's network-enabled entertainment cluster 115. This entertainment cluster 115 may include a computer 140, and a device for playing the songs, such as a stereo 145. In one embodiment, song files are downloaded by the computer 140, converted, and sent to the stereo 145 in a playable format.

Figure 2:
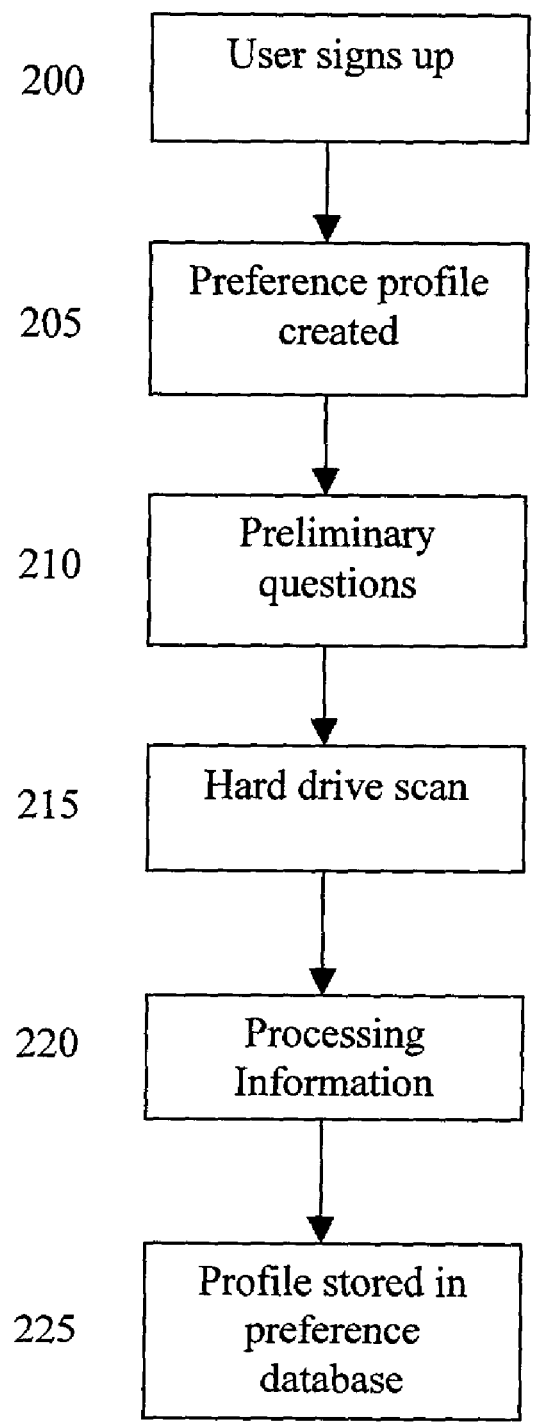
FIG. 2 is a flow chart illustrating the initialization of the automatic preference detection system when a user first signs up for the service according to an embodiment of the present invention.

The automatic media content preference detection system may be used in conjunction with any content distributing system, including a music distribution system over the Internet. In such an embodiment, a user 100 is able to access a music distribution service ("MDS") site over the Internet, where the user 100 may sign up for the MDS. FIG. 2 is a flow chart illustrating the initialization of the automatic preference detection system when a user 100 first signs up for the service according to an embodiment of the present invention. After a user 100 signs up 200 for the service by entering his name, billing address, etc., a preference profile is created 205 for that user 100. As the user 100 accesses and uses the system, continually updated information about the user's content preferences is stored in this profile. The information in this file is used to determine which songs to stream to the user 100. In order to make an initial educated guess about what types of music the user might like, the user may be asked certain preliminary questions 210, such as the user's favorite type of music, age, sex, where the user is living (country or area of USA), etc. The system may also search 215 the user's hard drive and peripherals for MP3, Real Audio, wave files, or any other music file formats. If song files stored on the user's 100 hard drive and peripherals have a known title and/or artist stored in the file name or somewhere within the file, this information is used to build an initial user preference profile. Next, all of the information from the preliminary questions 210 and the hard drive scan 215 is processed 220 and used to create an initial user preference profile. This data is then stored 225 in the user's 100 preference profile in the preference database 130.

Figure 3:
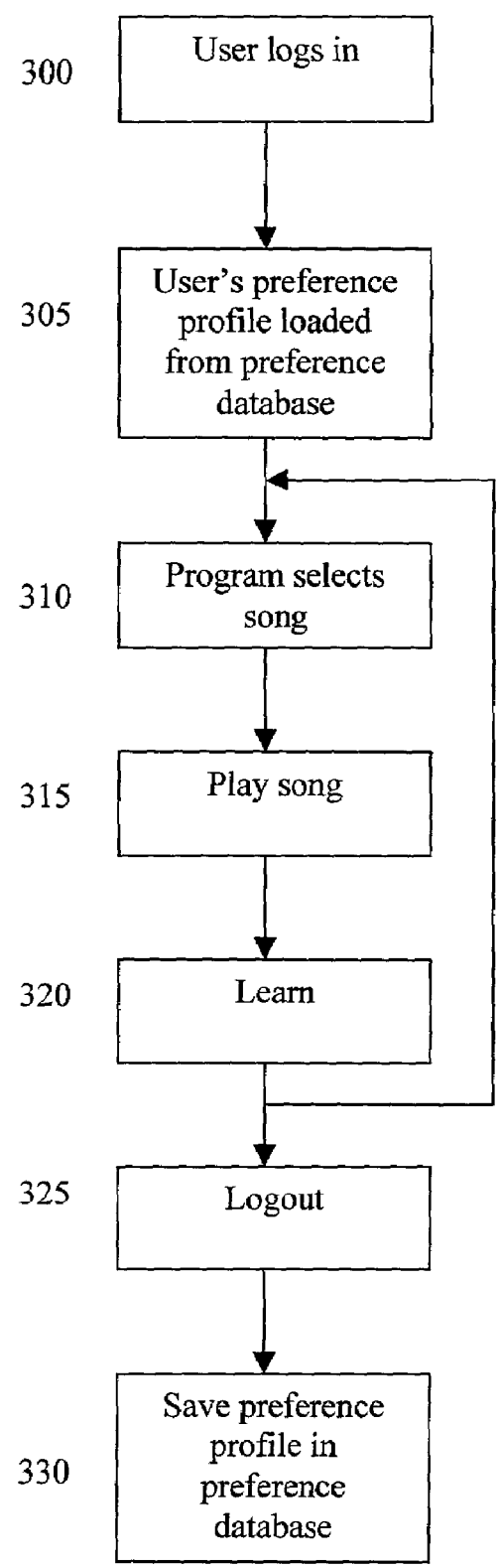
FIG. 3 is a flow chart illustrating the processing that occurs when a user is logged into the automatic preference detection system according to an embodiment of the present invention.

After the user 100 has signed up for the MDS, the user 100 may begin using the MDS. FIG. 3 is a flow chart illustrating the processing that occurs when a user 100 is logged into the automatic preference detection system according to an embodiment of the present invention. As shown in FIG. 3, the user 100 must first log in 300 to use the MDS. Next, the user's 100 preference profile is loaded 305 from the preference database 130. A program 310 then uses the user's 100 profile and the profiles of other users to determine which song to send to the user 100. The profiles of other users are used because patterns may appear in other profiles that may aid in selecting a song the user 100 might like. For example, if a user's 100 profile shows an affinity for new wave pop synthesizer music from the 80s, then a techno song from a 90s group, such as New Order, may be sent to the user 100 if the profiles of many other users show affinities for both new wave pop synthesizer music from the 80s and for techno songs from 90s groups such as New Order.

The program 310 typically selects a song that it has determined the user 100 is likely to enjoy. However, the program 310 will periodically select songs that it does not know whether the user 100 will like. For example, where a user's 100 profile indicates an affinity for 80s synth dance music, the program 310 may occasionally send an oldies, classical, or country song to the user to see whether the user 100 likes the song. The newer and less-developed a user's 100 profile is, the more likely it is that the program will select such a song to be sent to the user 100. Next, the selected song is sent by the MDS to the user's 100 computer 140, where it is converted into a stereo-playable format and sent to the stereo 145, where it plays 315. The system learns 320 from the user's 100 responses while the song plays. If the user 100 skips to the next song, the system will infer that the user 100 dislikes that song and its associated attributes. The earlier into the song the user 100 skips to the next song, the more the system will infer the user 100 dislikes the song. After the song finishes playing or the user 100 skips to the next song, the program then selects 310 the next song to be played and the MDS sends it to the user's 100 computer 140. This process continues until the user 100 logs out 325 of the MDS. Upon logout, the user's 100 updated preference profile is saved 330 in the preference database 130.

Figure 4A:
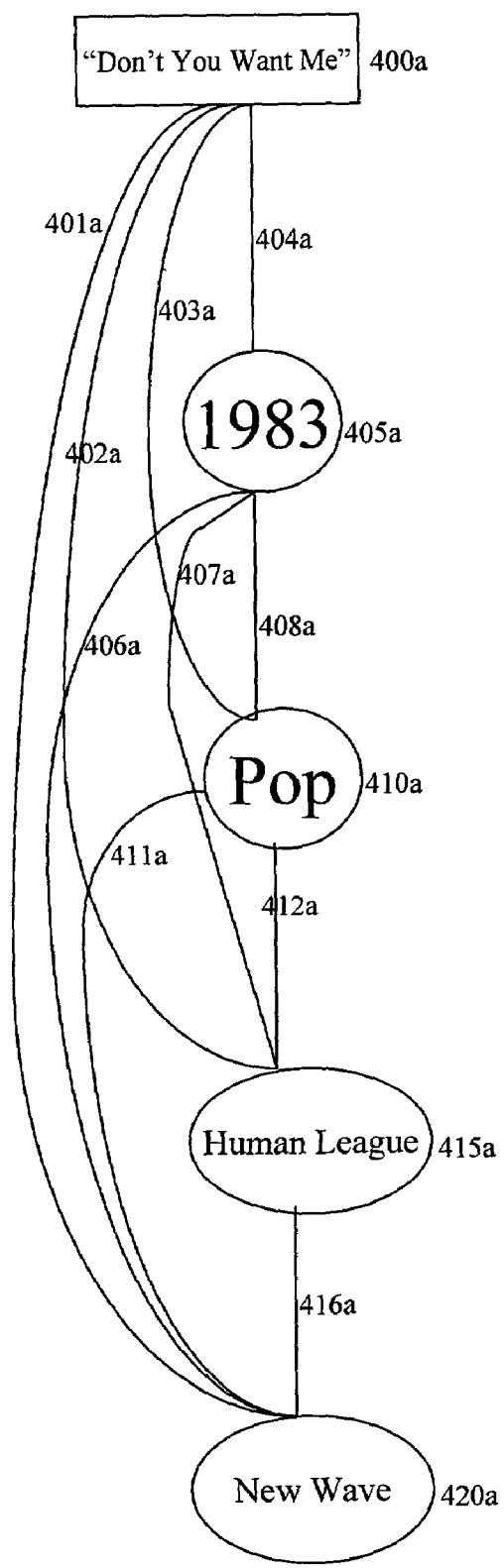
FIG. 4a is a diagram illustrating the relationship between a first song and four of the first song's attributes before system learning according to an embodiment of the present invention.

FIG. 4*a* is a diagram illustrating the relationship between a first song and four of the first song's attributes before system learning according to an embodiment of the present invention. In FIG. 4*a*, the song file, "Don't You Want Me," is categorized according to five attributes: title 400*a*, year of release 405*a*, general song style 410*a* (other examples include "oldies," "rap," "classical," etc.), artist 415*a*, and a specific song style 420*a*. While only five attributes are shown in FIG. 4*a*, many more may be used in different embodiments. Here, each attribute has been given an equal weight. In other embodiments, certain attributes such as general song style 410*a* may be accorded greater weighting than other attributes. Each attribute in FIG. 4*a* is associated with each other attribute. This association is shown by the lines that connect each attribute to each other, 401*a*–404*a*, 406a–408a, 411a–412a, and 416a. Each of these connections is also assigned a score. If no information is in the user profile for any of these attributes, the system does not know whether the user is likely to prefer this song or any of its attributes. When the system selects a song to send the user 100 that the user 100 listens to all the way through without hitting the "Next Song" key on the user control point 105, the system learns that the user 100 likes the song, the connections between each attribute are strengthened, and the system assigns a high score for each of the song's attributes, and for each of the connections between each attribute. For example, if this system were to infer that a user liked a song comprised on three attributes, A, B, and C. a high score would be assigned to each of these attributes. A high score would also be assigned to each combination of these attributes: A and B, A and C, and B and C.

Figure 4B:
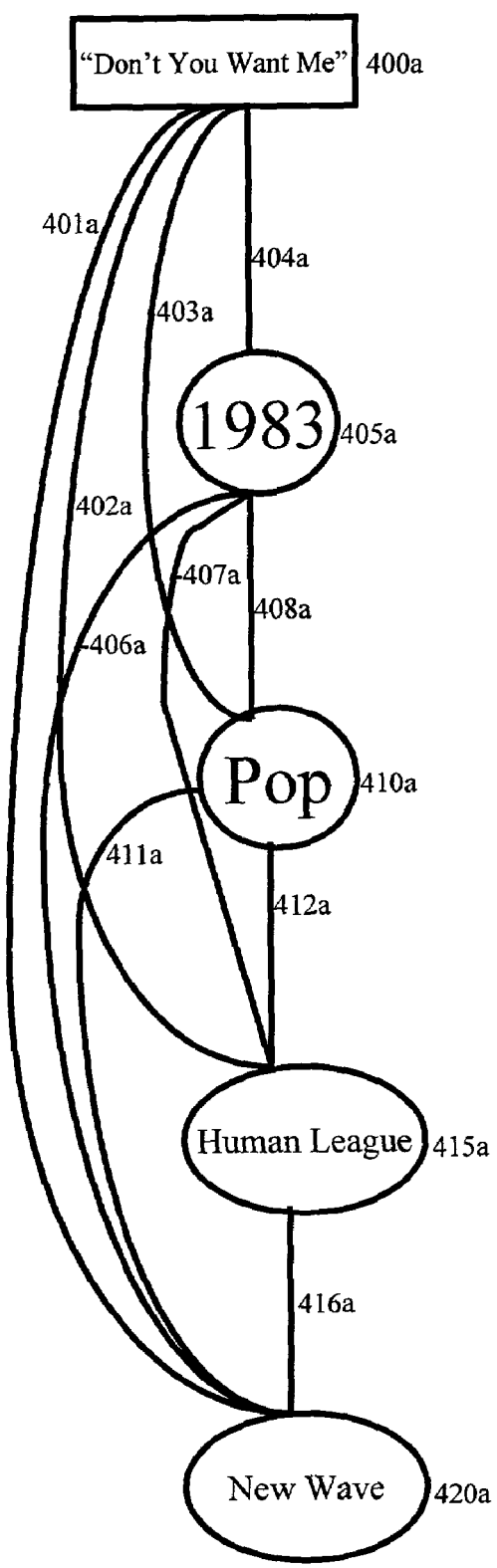
FIG. 4b is a diagram illustrating the relationship between the first song and four of the first song's attributes after system learning according to an embodiment of the present invention.

FIG. 4b is a diagram illustrating the relationship between the first song and four of the first song's attributes after system learning according to an embodiment of the present invention. FIG. 4b shows the result where the user 100 liked the song "Don't You Want Me" 400a. A high score is assigned to each attribute and to the connections between each attribute, as illustrated by the dark lines around and between each attribute.

Figure 4C:
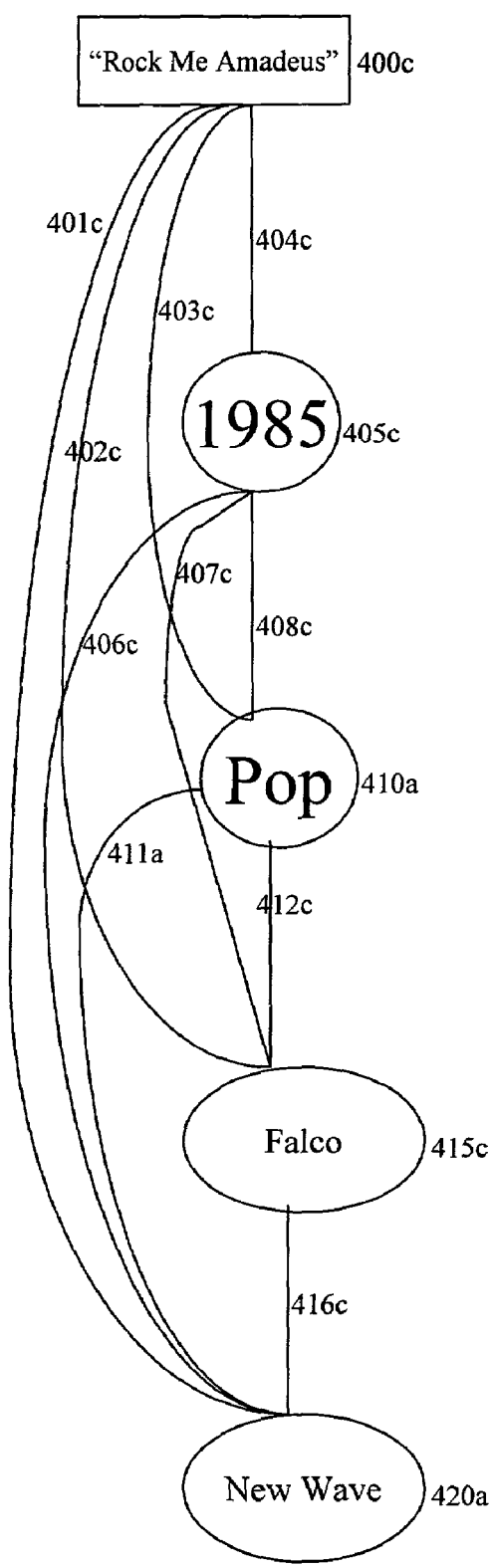
FIG. 4c is a diagram illustrating the relationship between a second song and four of the second song's attributes before system learning according to an embodiment of the present invention.
Figure 4D:
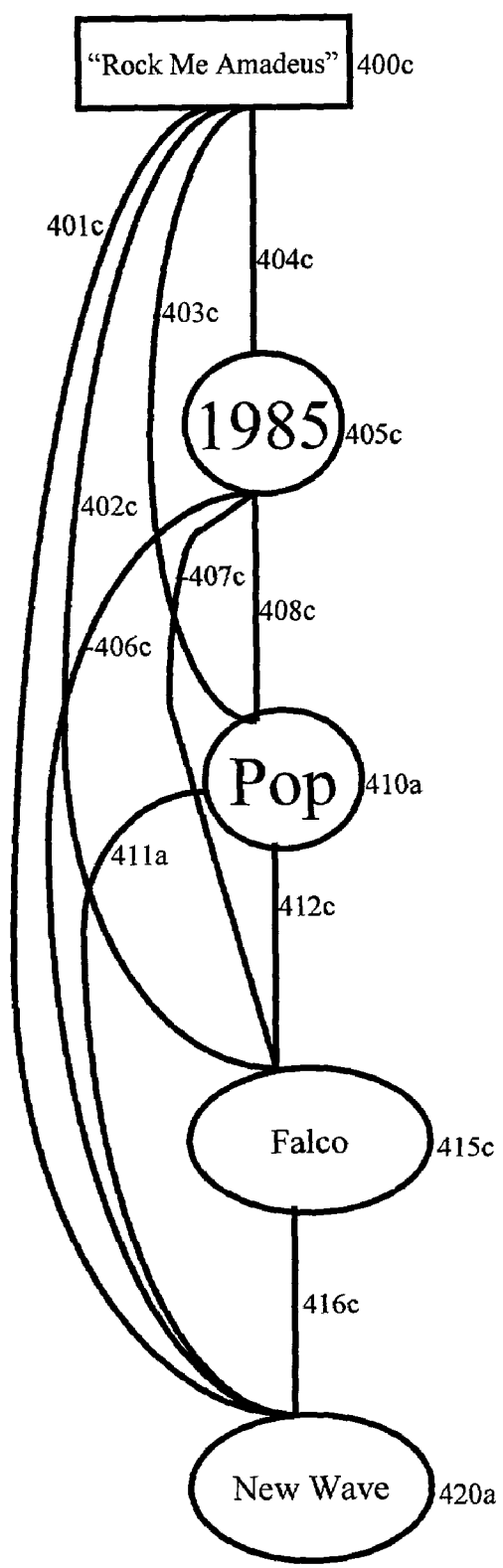
FIG. 4d is a diagram illustrating the relationship between the second song and four of the second song's attributes after system learning according to an embodiment of the present invention.
Figure 4E:
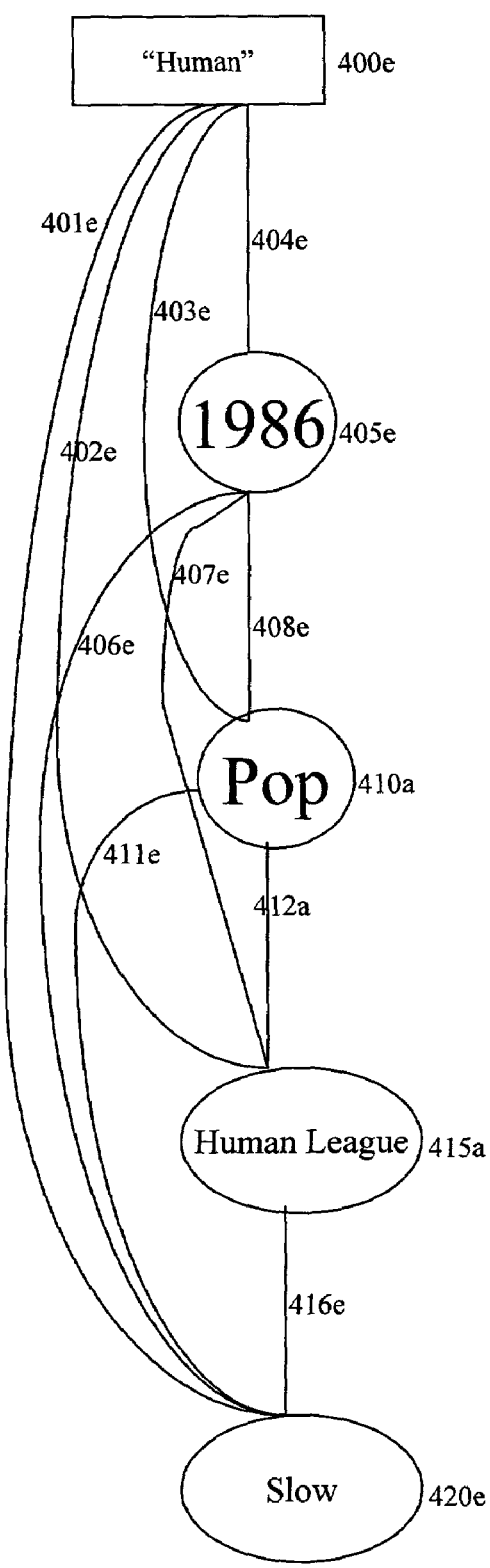
FIG. 4e is a diagram illustrating the relationship between a third song and four of the third song's attributes before system learning according to an embodiment of the present invention.
Figure 4F:
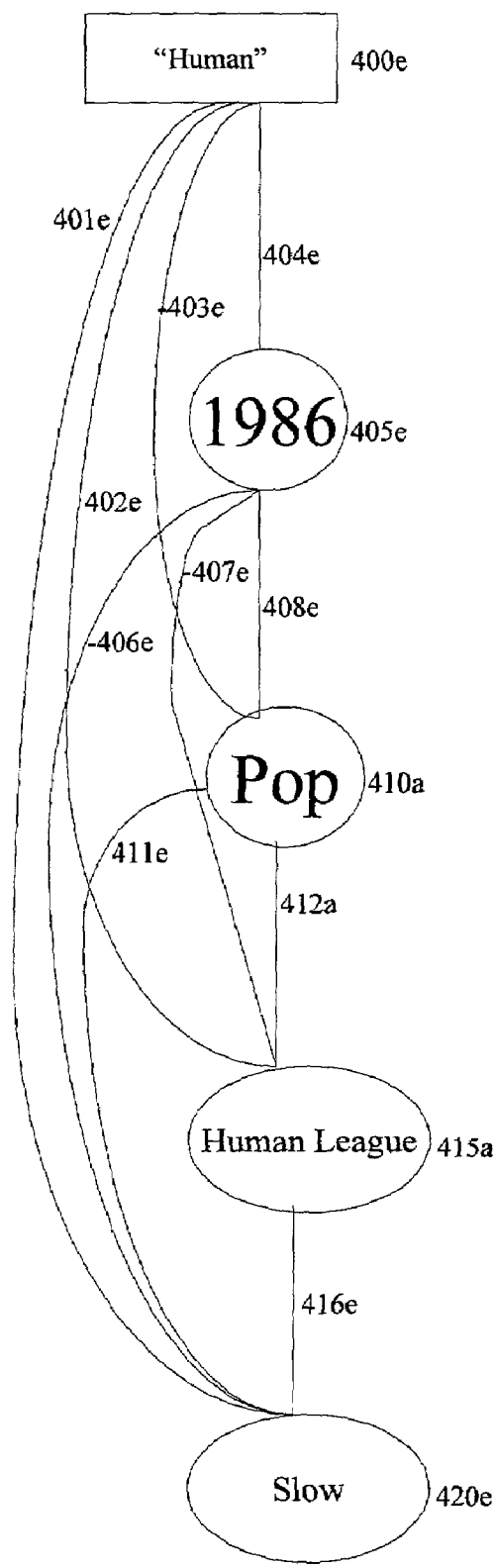
FIG. 4f is a diagram illustrating the relationship between the third song and four of the third song's attributes after system learning according to an embodiment of the present invention.
Figure 4G:
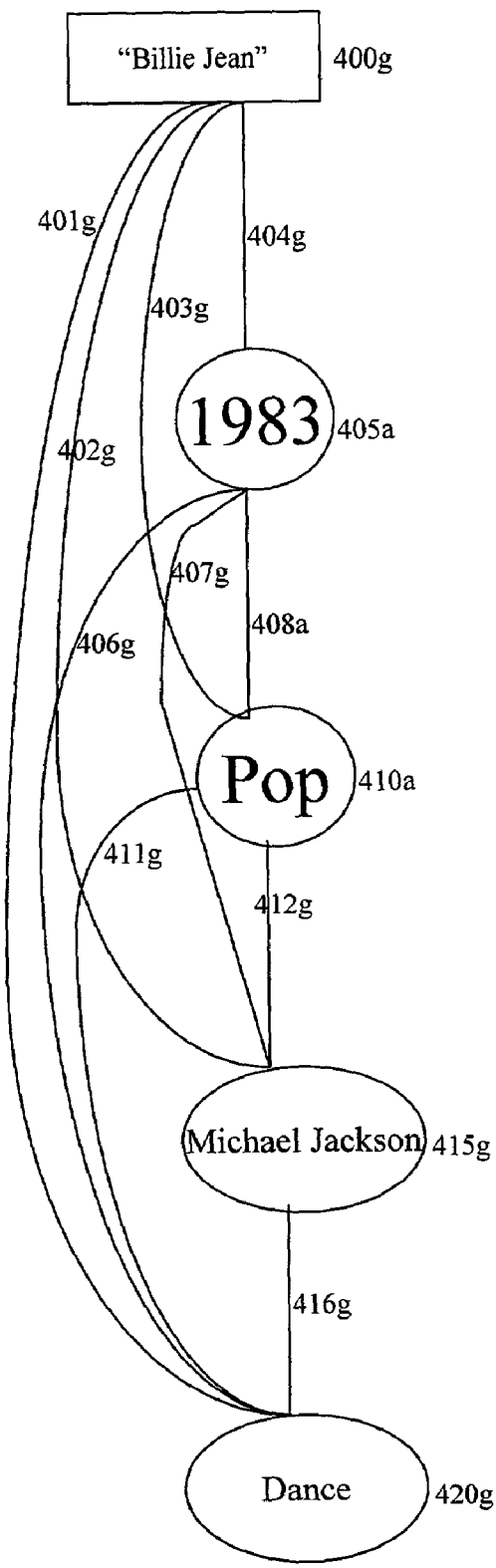
FIG. 4g is a diagram illustrating the relationship between a fourth song and four of the fourth song's attributes before system learning according to an embodiment of the present invention.

FIGS. 4c, 4e, and 4g are similar to FIG. 4a. FIG. 4c is a diagram illustrating the relationship between a second song and four of the second song's attributes before system learning according to an embodiment of the present invention. FIG. 4e is a diagram illustrating the relationship between a third song and four of the third song's attributes before system learning according to an embodiment of the present invention. FIG. 4g is a diagram illustrating the relationship between a fourth song and four of the fourth song's attributes before system learning according to an embodiment of the present invention.

Figure 4H:
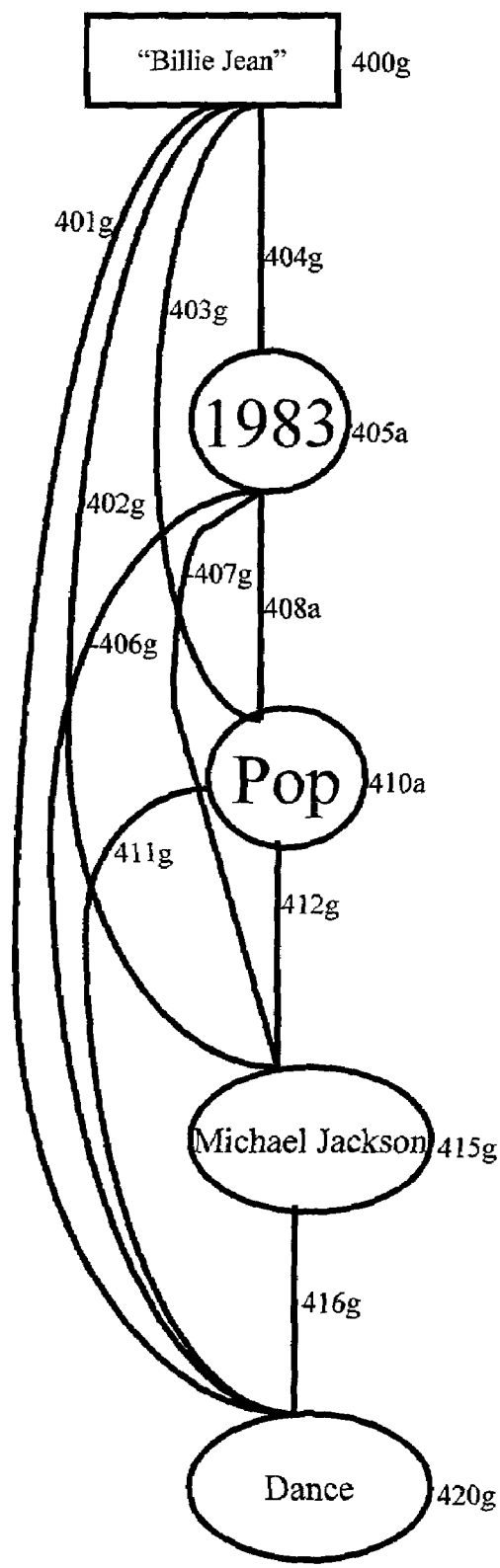
FIG. 4h is a diagram illustrating the relationship between the fourth song and four of the fourth song's attributes after system learning according to an embodiment of the present invention.

FIGS. 4d, 4f, and 4h are similar to FIG. 4b. FIG. 4d is a diagram illustrating the relationship between the second song and four of the second song's attributes after system learning according to an embodiment of the present invention. FIG. 4f is a diagram illustrating the relationship between the third song and four of the third song's attributes after system learning according to an embodiment of the present invention. FIG. 4h is a diagram illustrating the relationship between the fourth song and four of the fourth song's attributes after system learning according to an embodiment of the present invention.

FIGS. 4d and 4h are similar to FIG. 4b, in that they show the connections after songs are played that the system inferred that the user 100 liked, as evidenced by the "Next Song" button on the user control point 105 not being hit during their play. FIG. 4f, on the other hand, shows the result where the system inferred that the user 100 dislikes a song, where each of the connections between each attribute are weakened, indicating that the system infers that the user 100 doesn't like the song. The earlier into the song the "Next Song" button is depressed on the user control point 105, the more the system will infer the user dislikes the song and each of its attributes. This system correspondingly assigns each attribute a lower score.

Figure 4I:
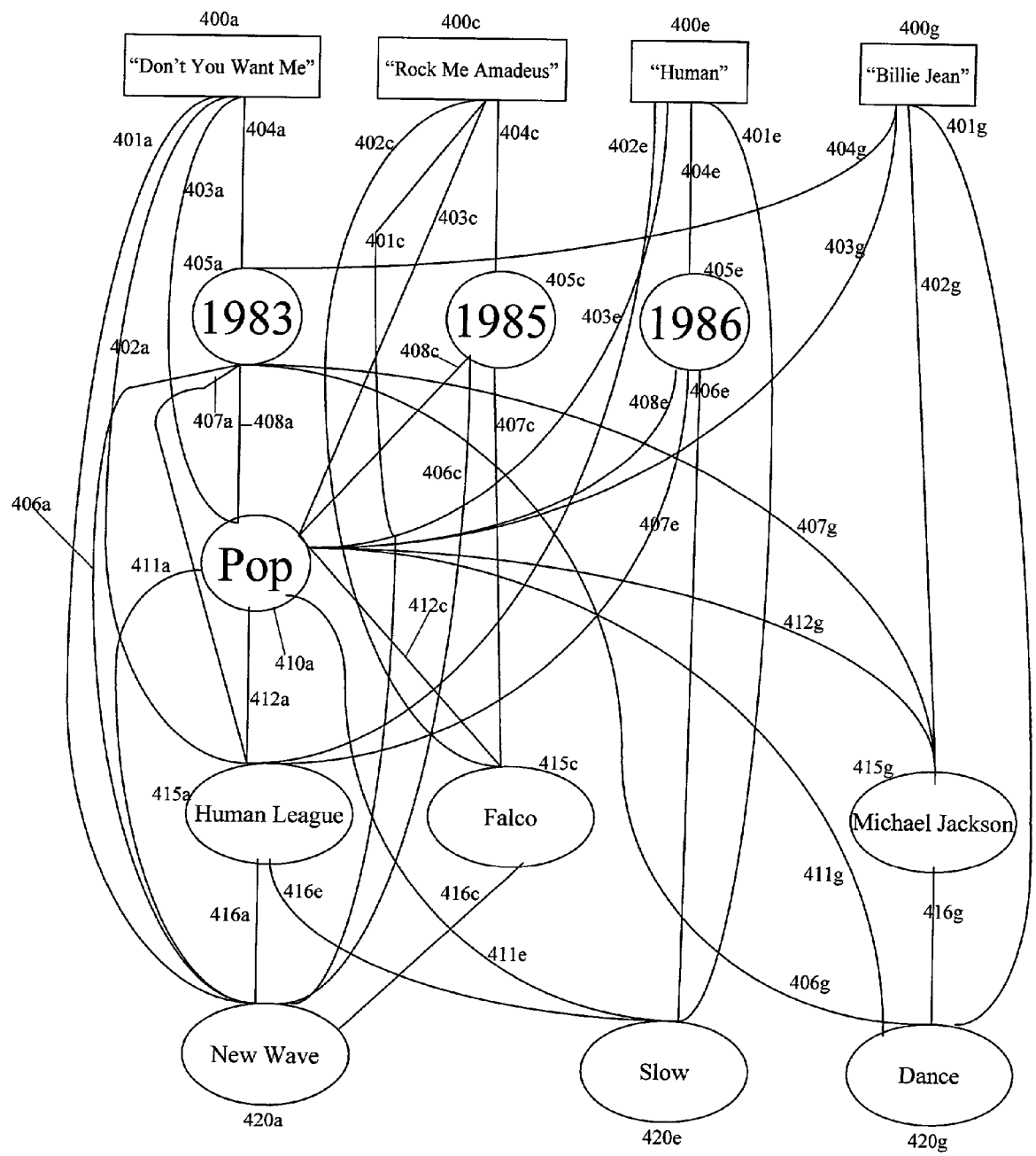
FIG. 4i is a diagram illustrating the relationship between the four songs in FIGS. 4a, 4c, 4e and 4g and four of the songs' attributes before system learning according to an embodiment of the present invention.
Figure 4J:
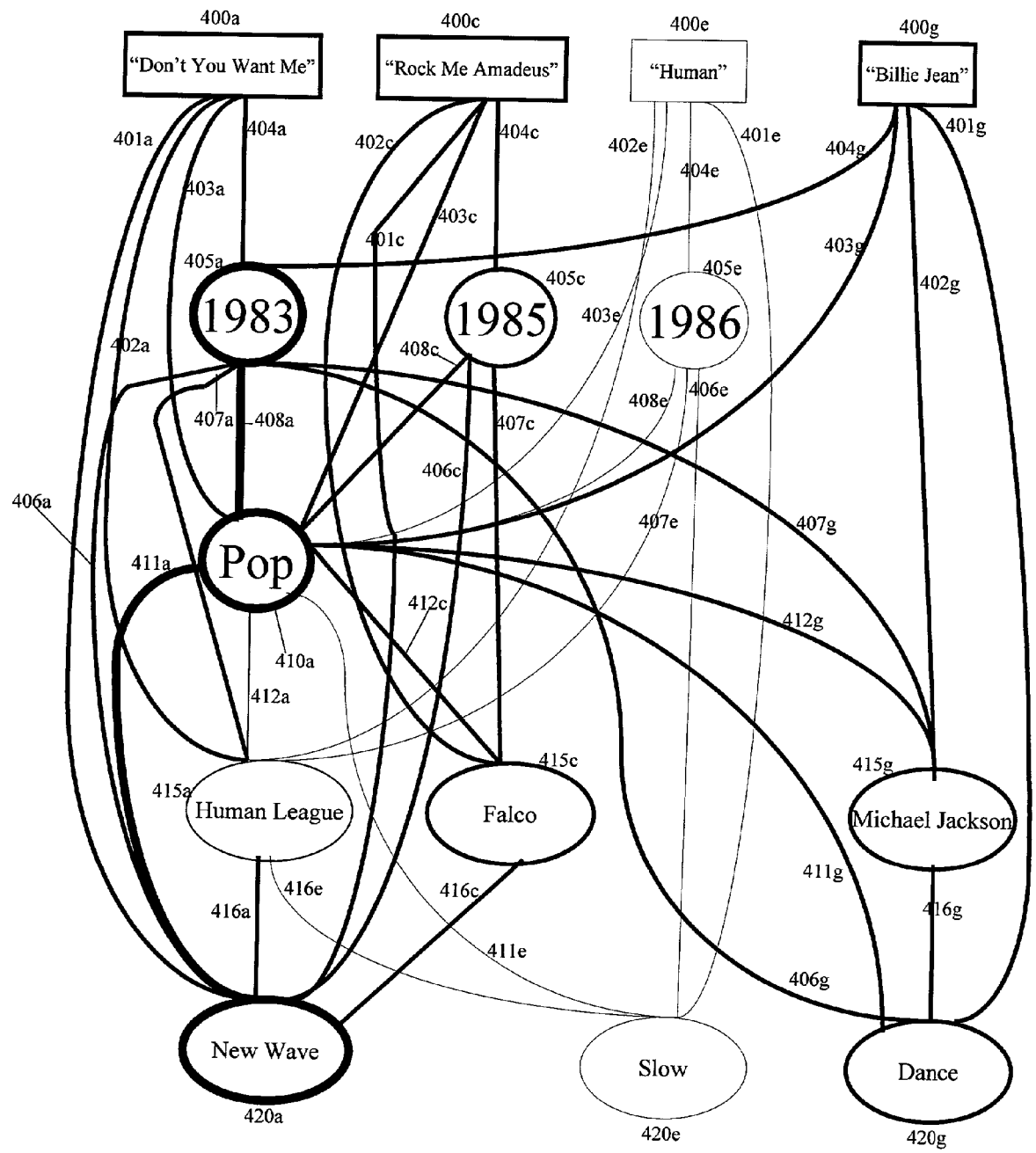
FIG. 4j is a diagram illustrating the relationship between the four songs in FIGS. 4b, 4d, 4f and 4h and four of the songs' attributes after system learning according to an embodiment of the present invention.

FIG. 4i is a diagram illustrating the relationship between the four songs in FIGS. 4a, 4c, 4e and 4g and four of the songs' attributes before system learning according to an embodiment of the present invention. FIG. 4j is a diagram illustrating the relationship between the four songs in FIGS. 4b, 4d, 4f and 4h and four of the songs' attributes after system learning according to an embodiment of the present invention. As is evident in FIG. 4j, the connections between attributes in songs that the system inferred the user 100 liked are strengthened, and those in the song that the system inferred the user 100 disliked are weakened. For example, one song is associated with the year released attribute "1985" 405c. Since the system inferred that the user 100 liked "Rock Me Amadeus" 400c, the song associated with this attribute, the system now infers that the user may like other songs associated with the "1985" 405c attribute. This is evidenced by the darker circle around "1985" 405c in FIG. 4j. The system also infers that the user may dislike songs from 1986, since that date is associated with "Human" 400e. Consequently, its score is decreased. This is evidenced by the lighter circle around "1986" 405c in FIG. 4j, than in FIG. 4i.

The system infers that the user really likes songs from 1983 since the user did not skip to the next song during the play of "Don't You Want Me" 400a and "Billie Jean" 400g, both songs associated with the 1983 attribute 405a. This association is illustrated by the dark circle around 1983 405a, which is darker than the circle around 1985 405c in FIG. 4j. Also, the system does not know whether the user likes songs by the "Human League" 415a, since the user did not skip to the next song during the play of "Don't You Want Me" 400a, but did skip to the next song during the play of "Human" 400e, both of which are associated with the Human League 415a attribute. Consequently, songs with the Human League 415a attribute are no less likely to be played than they were before the learning began. However, songs with the 1986 405e attribute are now less likely to be played since the user disliked the sole 1986 song "Human" 400e. Songs with the 1985 attribute are now more likely to be played than before, because the user did not skip to the next song during the play of the sole song with this attribute, "Rock Me Amadeus" 400c. Songs associated with 1983 405a are even more likely to be played than 1985 405c songs, because the user did not skip to the next during the playing of either of the 1983 405a songs, "Don't You Want Me" 400a and "Billie Jean" 400g. The same process and reasoning applies to each other attribute. As is evidenced by FIG. 4j, the automatic media content preference detection system is capable of learning that the user likes a particular artist such as the Human League 415a, but dislikes a particular song, or vice-versa. The same is true with respect to each attribute.

If the user had logged out 325 (see FIG. 3) of the system after the four songs had played, the newly learned information is stored 330 in the user's preference profile in the preference database 130. The next time the user logs in 300, the system will be more likely to play songs with the following attributes: 1983 405a, pop 410a, and new wave 420a. The system may also use the other user profiles in the preference database to make a more educated guess at what other songs besides those with the three aforementioned attributes the user might like to hear.

The system may also be configured to handle a situation where a user 100 logs into the system, but then either walks away from his stereo 145, or simply does not pay attention to the songs being played. In such a scenario, it would be undesirable for the system to learn from the user's nonresponsiveness because any information learned may be inaccurate. Therefore, this system may be programmed to store learned information in a temporary file until the user 100 hits the "Next Song" button, or some other button, such as volume, on the user control point 105. For example, after the user hits "Next Song" on the user control point 105, then the information in the temporary user profile is moved into the permanent user profile file. The reason for this is in case the user isn't paying attention, or leaves his stereo, this system is intelligent enough to learn that after a certain number of songs have played in their entirety, that the user 100 is passively listening, if at all. Such information is not very useful in determining the user's 100 music preferences, so it is never moved from the temporary user profile file.

The speed at which the learning process occurs is determined by the program 310. A more "heavily weighted" program may be used when a fast learning process is desired. However, where a slower learning process is desired, a more "lightly weighted" program may be used. Where a heavily weighted program is used, the system quickly learns the user's 100 preferences, and if the user's content tastes change, the system will quickly adapt to these changes. On the other hand, where a lightly weighted program is used, the system will more slowly learn the user's 100 preferences. However, where a lightly weighted program is used, any isolated instances of anomalies in the user's 100 responses (such as not wanting to listen to slow songs on rainy days or when the user is depressed, or where other people with different content preferences than the user are using the system), are insufficient to drastically change the user's 100 preference profile, because it changes only slowly over time.

The program 310 in this system may also be programmed to periodically select songs based solely upon the time of day, week, year, etc. For example, in December, the program may be configured to select Christmas songs. If the program 310 learns that the user 100 does not like Christmas songs, it may start sending songs from other cultures, such as Jewish or Indian songs. Also, the program may be programmed to, based on the user's 100 preference profile, choose songs at a particular time that a radio station would also be playing. For example, where a user's profile indicates the user 100 likes some 80's music, even if the user 100 also likes other styles, the program may be programmed to select only 80's songs on a Friday night, since there are radio stations that play only 80's music on Friday nights. Other time-sensitive programs may also be handled by the program 310, such as heavy metal Saturday nights, etc.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automatic user preference detection computer system, comprising:
   a preference determination module, independent of a user computing device, to determine a preference profile for a user of a media content distribution source, the preference profile being based on previously determined media scores for the user and local media content files determined by scanning a disk drive of the user computing device to determine the local media content files stored on the user computing device;
   a database, independent of the user computing device, to store the preference profile for the user of the media content file distribution source;
   a score calculation module, independent of the user computing device, to determine a score for a media content file distributed to the user by the media content file distribution source, wherein the score is calculated based on a comparison of a length of time in which the user allows the media content file to be played at the user computing device relative to a total length of the media content file; and
   a processing module, independent of the user computing device, to modify the preference profile based on the score to create a new preference profile, wherein the processing module further selects a second media content file to distribute to the user based on the new preference profile,
   wherein the score for the media content file is stored in a temporary storage file and if the user allows multiple media content files to be played, in their entirety, for a predetermined length of time by not pressing a media control point, the score for the media content file is not moved to a permanent storage file.

2. An automatic user preference detection computer system, comprising:
   a preference determination module, independent of a user computing device, to determine a preference profile for a user of a media content distribution source, the preference profile being based on previously determined media scores for the user and local media content files determined by scanning a disk drive of the user computing device to determine the local media content files stored on the user computing device;
   a database, independent of the user computing device, to store the preference profile for the user of the media content file distribution source;
   a score calculation module, independent of the user computing device, to determine a score for a media content file distributed to the user by the media content file distribution source, wherein the score is calculated based on a comparison of a length of time in which the user allows the media content file to be played at the user computing device relative to a total length of the media content file; and
   a processing module, independent of the user computing device, to modify the preference profile based on the score to create a new preference profile, wherein the processing module further selects a second media content file to distribute to the user based on the new preference profile,
   wherein the score calculation module stops calculating the score for succeeding media content files after a predetermined length of time if the user allows multiple media content files to be played in their entirety by not pressing a media control point.

3. The system of claim 2, wherein the media content file is a music file.

4. The system of claim 2, wherein a rate at which the processing module modifies the preference profile is configurable.

5. The system of claim 2, wherein the preference detection computer system determines the length based on user's responses made with a user control point.

6. The system of claim 2, wherein the user control point is a remote control.

7. The system according to claim 2, wherein the second media content file is sent to the user computing device via an Internet stream.

8. The system of claim 2, wherein the processing module periodically selects testing media content files to distribute to the user, wherein the testing media content files are randomly selected to test whether the user's media content file preferences have changed.

9. The system of claim 2, wherein the processing module further modifies the preference profile based on responses of other users having similar media preferences.

10. The automatic user preference detection computer system of claim 2, wherein the selection of the media content file to distribute to the user is based on the initial preference profile and a time of the week, such as a night of a week.

11. An article comprising a storage medium having stored thereon instructions that when executed by a machine result in the following:
   storing a preference profile for a user of a media content file distribution source at the media content file distribution source which is independent of a user computing device, the preference profile being based on previously determined media scores for the user and media content files of the user computing device determined by scanning a disk drive of the user computing device;
   determining a score for a media content file, at a preference processing subsystem independent of the user computing device, distributed to the user by the media content file distribution source, wherein the score is calculated based on a comparison of a length of time in which the user allows the media content file to be played at the user computing device relative to a total length of the media content file;
   modifying the preference profile, at the preference processing subsystem independent of the user computing device, based on the score to create a modified preference profile; and
   selecting a second media content file, at the preference processing subsystem of the user computing device, to distribute to the user based on the modified preference profile,
   wherein the score calculation module stops calculating the score for succeeding media content files after a predetermined length of time if the user allows multiple media content files to be played in their entirety by not pressing a media control point.

12. The article of claim 11, wherein media content file is a music file.

13. The article of claim 11, wherein a rate at which the preference profile is modified is configurable.

14. The article of claim 11, wherein the instructions further result in determining the length based on the user's responses made with a user control point.

15. The article of claim 11, wherein the instructions further result in sending the second media content file to the user computing device via an Internet stream.

16. The article of claim 11, wherein the instructions further result in periodically selecting testing media content files to distribute to the user, the testing media content files being randomly selected to test whether the user's media content file preferences have changed.

17. The article of claim 11, wherein the instructions further result in modifying the preference profile based on responses of other users having similar media preferences.

18. A method of automatically detecting media content preferences, comprising:
   storing a preference profile for a user of a media content file distribution source at the media content file distribution source which is independent of a user computing device, the preference profile being based on previously determined media scores for the user and media content files of the user computing device determined by scanning a disk drive of the user computing device;
   determining a score, at a preference processing subsystem independent of the user computing device, for a media content file distributed to the user by the media content file distribution source, wherein the score is calculated based on a comparison of a length of time in which the user allows the media content file to be played at the user computing device relative to a total length of the media content file;
   modifying the preference profile, at the preference processing subsystem independent of the user computing device, based on the score to create a modified preference profile; and
   selecting, at the preference processing subsystem independent of the user computing device, a second media content file to distribute to the user based on the modified preference profile,
   wherein the score for the media content file is stored in a temporary storage file and if the user allows multiple media content files to be played, in their entirety, for a predetermined length of time by not pressing a media control point, the score for the media content file is not moved to a permanent storage file.

19. The method of claim 18, wherein the media content file is a music file.

20. The method of claim 18, wherein a rate at which the preference profile is modified is configurable.

21. A method of automatically detecting media content preferences, comprising:
   storing a preference profile for a user of a media content file distribution source at the media content file distribution source which is independent of a user computing device, the preference profile being based on previously determined media scores for the user and media content files of the user computing device determined by scanning a disk drive of the user computing device;
   determining a score, at a preference processing subsystem independent of the user computing device, for a media content file distributed to the user by the media content file distribution source, wherein the score is calculated based on a comparison of a length of time in which the user allows the media content file to be played at the user computing device relative to a total length of the media content file;
   modifying the preference profile, at the preference processing subsystem independent of the user computing device, based on the score to create a modified preference profile; and
   selecting, at the preference processing subsystem independent of the user computing device, a second media content file to distribute to the user based on the modified preference profile,
   wherein the score calculation module stops calculating the score for succeeding media content files after a predetermined length of time if the user allows multiple media content files to be played in their entirety by not pressing a media control point.

22. The method of claim 21, wherein the media content file is a music file.

23. The method of claim 21, wherein a rate at which the preference profile is modified is configurable.

24. The method of claim 21, further including determining the length based on the user's responses made with a user control point.

25. The method according to claim 21, further including sending the second media content file to the user computing device via an Internet stream.

26. The method of claim 21, further including periodically selecting testing media content files to distribute to the user, wherein the testing media content files are randomly selected to test whether the user's media content file preferences have changed.

27. The method of claim 21, further including modifying the preference file based on responses of other users having similar media preferences.

* * * * *